(12) United States Patent
Chen

(10) Patent No.: US 8,966,137 B1
(45) Date of Patent: Feb. 24, 2015

(54) STORAGE DEVICE AND MEMORY ACCESSING METHOD FOR A STORAGE DEVICE

(71) Applicant: Transcend Information, Inc., Taipei (TW)

(72) Inventor: Ren-Wei Chen, New Taipei (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 0 days.

(21) Appl. No.: 13/958,602

(22) Filed: Aug. 4, 2013

(51) Int. Cl.
*G06F 3/06* (2006.01)
*G06F 11/16* (2006.01)
*G06F 12/02* (2006.01)
*G06F 13/38* (2006.01)

(52) U.S. Cl.
CPC ........ *G06F 11/1666* (2013.01); *G06F 12/0246* (2013.01); *G06F 2212/7211* (2013.01)
USPC ............ 710/36; 710/2; 710/5; 710/8; 710/14; 710/72

(58) Field of Classification Search
None
See application file for complete search history.

(56) References Cited

U.S. PATENT DOCUMENTS

2014/0012940 A1* 1/2014 Joshi et al. ............... 709/214
2014/0032515 A1* 1/2014 VAGHANI et al. ......... 707/704

* cited by examiner

*Primary Examiner* — Scott Sun
(74) *Attorney, Agent, or Firm* — Winston Hsu; Scott Margo

(57) ABSTRACT

A storage device and memory accessing method configure two separate memory units, each with dedicated I/O channel, accessible by two controllers, each corresponding to an interface connected to a host, and allows the storage device to establish at least two connections to the different hosts. As more than one connection is established between the storage device and the hosts at the same time, a first controller has both read and write accessibility to a first memory unit and a second controller has both read and write accessibility to a second memory unit, while the first controller has read-only accessibility to the second memory unit and the second controller has read-only accessibility to the second memory unit.

20 Claims, 8 Drawing Sheets

STORAGE DEVICE AND MEMORY ACCESSING METHOD FOR A STORAGE DEVICE

BACKGROUND

1. Technical Field

The invention relates to a storage device and memory accessing method, and more particularly, to a storage device with connectability to at least two hosts at the same time and memory accessing method for accessing memory units in the storage device by the hosts.

2. Description of the Conventional Art

Most portable devices such as USB flash drives, portable media players, mobile phones with built-in storage, etc., are able to connect to more than one device/host through corresponding interface. For example, a portable device may have the capability of transmitting files through wireless connection and also connectable to a computer through a USB connector. Although a number of interfaces may be provided in the portable device for connection with other devices, it is a basic limitation that one channel at a time is workable for the portable device, e.g., for a mobile phone with wireless connection turned on and ready for one host and also with physical connection to another host through USB interface, it can be expected that only one channel, either the wireless connection or the physical connection, will be workable for the mobile phone when both connections are active.

Generally, the controller of a portable device, say, a mass storage device, does not take data flow to and from the memory unit of the portable device with the concept of "files" but simply do the reading/writing of the memory unit as commanded. It also lacks of communication and coordination between any built-in OS, such as the linux system, the android system, or the iOS system in the mobile phones, and other OS as in a computer. This is why the rest of the interfaces of a portable device will be shutdown when the portable device is being connected to a computer/host through the USB connector (or through wireless connection). Hence, any portable device or storage device equipped with more than one way to have connection and data exchange with more than one host should only be able build a data accessing channel with one host at a time, which is quite an inconvenience.

Although a third-party application may be developed and installed in one of the hosts that functions as a coordinator among the hosts that are in need of using the channels of the portable device, it takes extra effort to build and install such application in the host, not to mention such application is strongly system dependent.

SUMMARY

According to the embodiments of the invention, a storage device adapted for being connected to and accessible by a first host and a second host is provided. The storage device includes a first controller, a second controller, a first memory unit, and a second memory unit. The first controller is electrically connected to a first interface that is used to connect to the first host, and the second controller is electrically connected to a second interface that is used to connect to the second host. Both the first memory unit and the second memory unit are connected to and accessible by the first controller and the second controller. When the storage device is connected to and accessible by the first host and the second host at the same time, the first memory unit is readable and writable to the first controller and read-only to the second controller, and the second memory unit is readable and writable to the second controller and read-only to the first controller.

Another embodiment of the storage device also provides that when the storage device is connected to the first host and not connected to the second host, both the first memory unit and the second memory unit are readable and writable to the first controller, and when the storage device is connected to the second host and not connected to the first host, both the first memory unit and the second memory unit are readable and writable to the second controller.

Another embodiment of the storage device also provides that the first interface is a universal serial bus (USB) connector, the second interface is a wireless network channel, and the first memory unit and the second memory unit are non-volatile flash memory.

Another embodiment of the storage device also provides that the first memory unit includes a first bad block table and the second memory unit includes a second bad block table. When the storage device is connected to the first host and the second host at the same time, the first bad block table is updatable to the first controller and read-only to the second controller, and the second bad block table is updatable to the second controller and read-only to the first controller. The second controller is adapted for delivering an ECC data of the first memory unit to the first controller, and the first controller is adapted for updating the first bad block table according to the ECC data delivered by the second controller.

According to the embodiments of the invention, a memory accessing method for a storage device is also provided. The storage device includes a first controller electrically connected to a first interface adapted to be connected to a first host, a second controller electrically connected to a second interface adapted to be connected to a second host, a first memory unit and a second memory unit, both connected to the first controller and the second controller. The memory accessing method includes following steps: detecting whether the first interface and the second interface are respectively connected to the first host and the second host; configuring the first memory unit readable and writable to the first controller and read-only to the second controller when the storage device is connected to the first host and the second host at the same time.

Another embodiment of the memory accessing method also includes the following steps: configuring both the first memory unit and the second memory unit readable and writable to the first controller when the storage device is only connected to the first host and not connected to the second host.

Another embodiment of the memory accessing method also provides that when the storage device is connected to the first host and the second host at the same time, the memory accessing method further includes the following step: when the second controller is requesting a reading access to the first memory unit, the first controller providing for the second controller reading control to the first memory unit.

Another embodiment of the memory accessing method also includes the following steps: the first controller updating a first bad block table of the first memory unit; the first controller notifying the second controller an update of the first bad block table; and the second controller reading the first bad block table of the first memory unit.

Another embodiment of the memory accessing method also includes the following steps: the second controller detecting an ECC error when reading the first memory unit; the second controller notifying the first controller of the ECC error; and the first controller updating a bad block table of the first memory unit according to the ECC error.

According to the embodiments of the invention, a memory accessing method for a storage device is also provided. The storage device includes a first controller electrically connected to a first interface, a second controller electrically connected to a second interface, and a first memory unit and a second memory unit, both connected to the first controller and the second controller. The memory accessing method includes steps: initiating the first controller when the first interface is connected to a first host; detecting whether the second controller is initiated; configuring the first controller to have both read and write authority to both the first memory unit and the second memory unit when the second controller is not initiated; and configuring the first controller to have both read and write authority to the first memory unit and the second controller to have both read and write authority to the second memory unit when the second controller is initiated.

Another embodiment of the memory accessing method also includes step: configuring the first controller to have only read authority to the second memory unit and the second controller to have only read authority to the first memory unit when the second controller is initiated.

Another embodiment of the memory accessing method further provides that the step of detecting whether the second controller is initiated is performed by the first controller, and the second controller is initiated when the second interface is connected to a second host.

Another embodiment of the memory accessing method further provides that the step of the first controller detecting whether the second controller is initiated is performed through a communication channel existed between the first controller and the second controller.

Another embodiment of the memory accessing method also includes steps: updating a first bad block table of the first memory unit by the first controller; notifying the second controller the update of the first bad block table; and reading the first bad block table of the first memory unit by the second controller.

Another embodiment of the memory accessing method also includes steps: detecting an ECC error by the second controller when reading the first memory unit; notifying the first controller of the ECC error by the second controller; and updating a bad block table of the first memory unit according to the ECC error by the first controller.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct electrical connection. Thus, if a first device is coupled to a second device, that connection may be through a direct electrical connection, or through an indirect electrical connection via other devices and connections.

Figure 1:
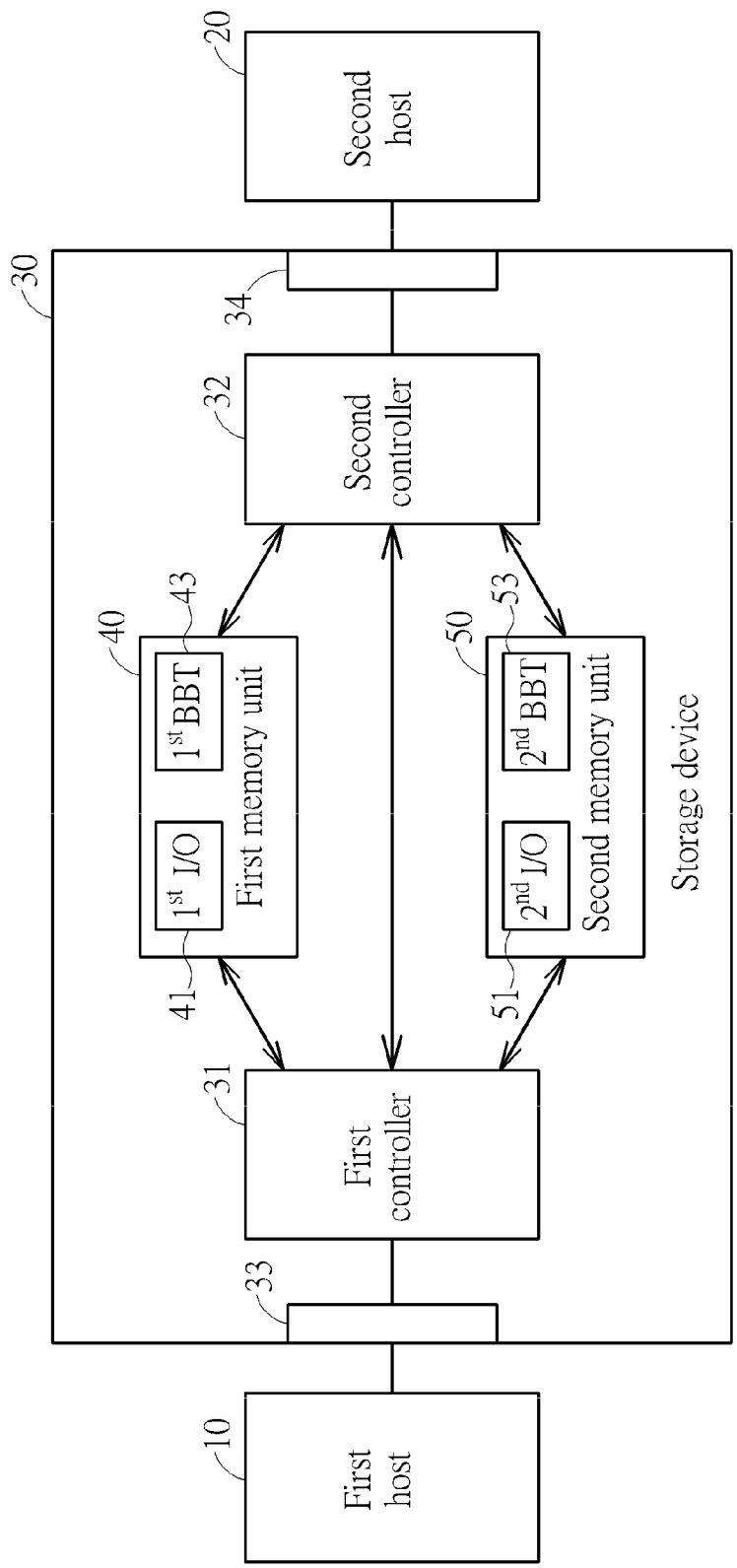
FIG. 1 shows an illustration of an embodiment of a storage device connected to a first host and a second host.

Please refer to FIG. 1. FIG. 1 shows an illustration of an embodiment of a storage device connected to a first host and a second host. The storage device 30 in discussion in the invention may be a USB flash drive, a portable media player, a mobile phone, or a portable device having mass storage. The storage device 30 includes two or more than two interfaces, each can be set to connect, either physically or wirelessly, to a host and data can be transferred between the host and the storage device 30. Examples are described in the embodiments of the invention in that the storage device has two interfaces; however, for any storage devices that have more than two interfaces, they should be regarded as within the scope of the invention through corresponding and proper modification according to the embodiments described in the invention. In the embodiment in FIG. 1, a first host 10 and a second host 20 are connected to the storage device 30. Each of the first host 10 and the second host 20 can be a computer, another storage device, a TV with connectability with other device. In some cases, the built-in OS (for example, an embedded Linux, an android system, or an iOS system) of the storage device 30 stored in the ROM may also be placed in the embodiment as either the first host 10 or the second host 20.

According to the way the storage device 30 builds connections with a number of hosts, the storage device 30 includes at least a first controller 31 of a first interface 33 and a second controller 32 of a second interface 34. The first interface 33 is used to connect to the first host 10 and the second interface 34 is used to connect to the second host 20. As mentioned, each of the first interface 33 and the second interface 34 can be set to connect, either physically or wirelessly, to a host. Hence, to describe the structure of the embodiment in an exemplary way, for example, the first interface 33 may be a universal serial bus (USB) connector and the second interface 34 may be a wireless network channel, which means the storage device 30 may be connected to the first host 10 via a USB connector and may be connected to the second host 20 wirelessly. As for the case that the first host 10 may also be the built-in OS of the storage device 30, it can be an integrated component in the storage device 30 that includes the three: the first controller 31, the first interface 33, and the first host 10.

The storage device 30 also includes a first memory unit 40 and a second memory unit 50, which preferably are non-volatile flash memories. It should be noted that the first memory unit 40 and the second memory unit 50 may be either physically separated entities or logically separated units. Each of the first memory unit 40 and the second memory unit 50 is an independent memory with dedicated I/O channel, which means the access to the first memory unit 40 is independent from the access to the second memory unit 50 and vice versa, and both the first memory unit 40 and the second memory unit 50 are allowed to be accessed simultaneously, since they have their own I/O channels. Accordingly, it can be shown in FIG. 1 that the first memory unit 40 is accessible through a first I/O channel 41 (denoting "$1^{st}$ I/O" in FIG. 1) and connected to both the first controller 31 and the second controller 32, and likewise, the second memory unit 50 is accessible through a second I/O channel 51 (denoting "$2^{nd}$ I/O" in FIG. 1) and connected to both the first controller 31 and the second controller 32. Also shown in FIG. 1, the first memory unit 40 also includes a first bad block table 43 (denoting "$1^{st}$ BBT" in FIG. 1) and the second memory unit 50 also includes a second bad block table 53 (denoting "$2^{nd}$ BBT" in FIG. 1). The first bad block table 43 and the second bad block table 53 serve as a record of the health status of the memory units whose structure and function should be easily acquirable by any person skilled in the art.

Figure 2A:
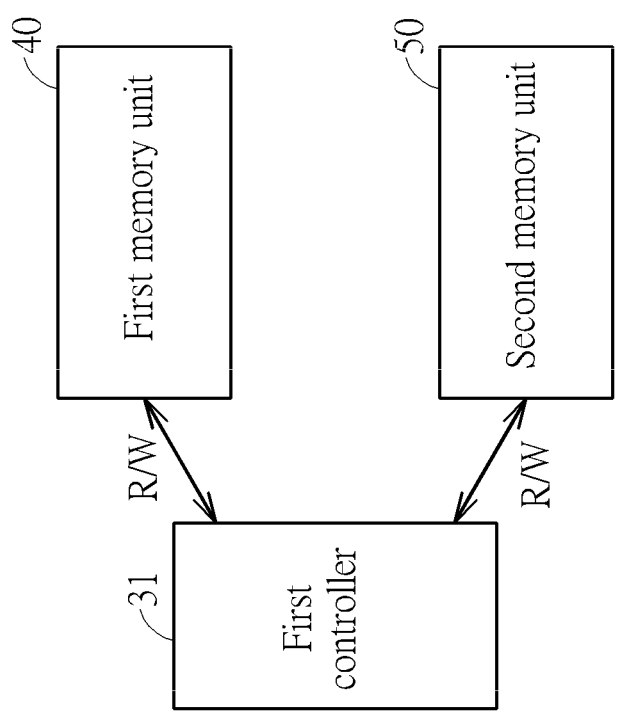
FIG. 2A, 2B are illustrations showing configurations of either the first controller or the second controller being initiated and accessible by only one host.
Figure 2B:
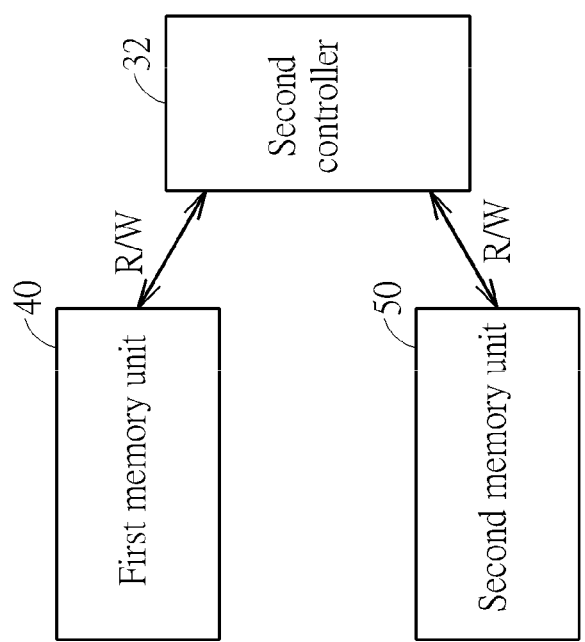

Please refer to FIG. 2A, 2B. FIG. 2A, 2B are illustrations showing configurations of either the first controller or the second controller being initiated and accessible by only one host. As shown in FIG. 2A, when the storage device 30 is connected to and accessible by the first host 10 and not connected to the second host 20, the first controller 31 has full accessibility of both the first memory unit 40 and the second memory unit 50, which means both the first memory unit 40 and the second memory unit 50 are accessible by the first controller 31. In FIG. 2B, when the storage device 30 is connected to and accessible by the second host 20 and not connected to the first host 10, the second controller 32 also has full accessibility of both the first memory unit 40 and the second memory unit 50, which means both the first memory unit 40 and the second memory unit 50 are accessible by the second controller 32.

Figure 3:
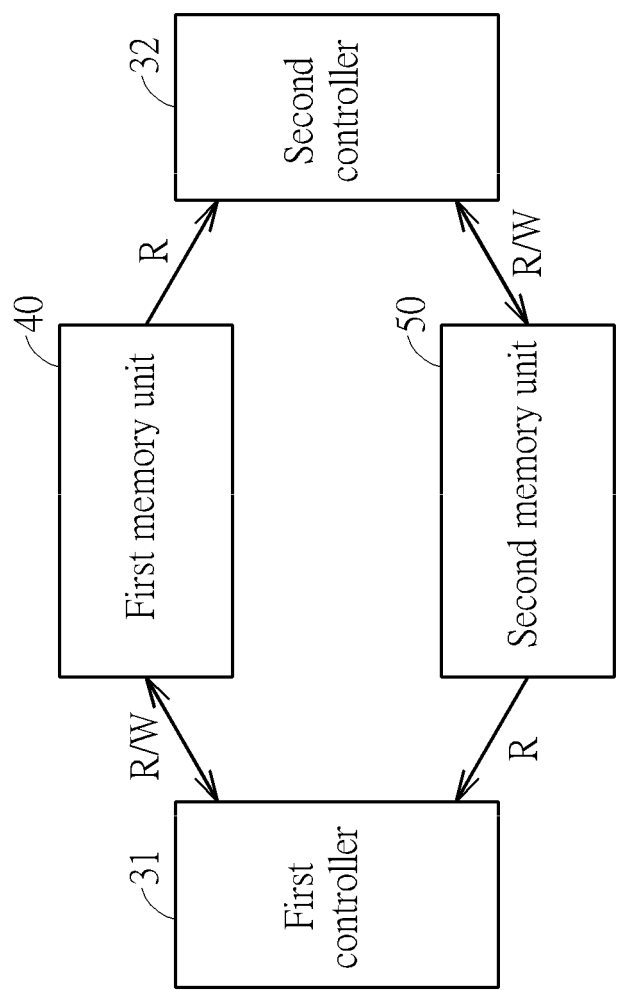
FIG. 3 is an illustration showing the configuration of the storage device when both the first interface and the second interface are connected to their corresponding hosts.

Please refer to FIG. 3. FIG. 3 is an illustration showing the configuration of the storage device when both the first interface and the second interface are connected to their corresponding hosts. To prevent causing potential data conflict under the condition that not just one controller has the authority of performing writing to any one memory unit, FIG. 3 and FIG. 1 show that when the storage device 30 is connected to and accessible by the first host 10 and the second host 20 at the same time, one of the memory units 40, 50 should be configured writable only to one controller while still readable by each of the controllers, i.e., the first memory unit 40 is readable and writable to the first controller 31 and read-only to the second controller 32, and the second memory unit 50 is readable and writable to the second controller 32 and read-only to the first controller 31. As such, both the first host 10 and the second host 20 can still access the storage device 30 but with some accessing restriction to part of the storage.

For example, when the first host 10 is a computer connected to the storage device 30, a mobile phone, via the first interface 33, an USB connector, and the second host 20 as the built-in OS of the storage device 30, the configuration in FIG. 3 allows the storage device 30 to connect to and transfer data to the computer, while writing data to the second memory unit 50, such as taking photos using the mobile phone and storing the photos in the mobile phone, is still an available function.

Figure 4:
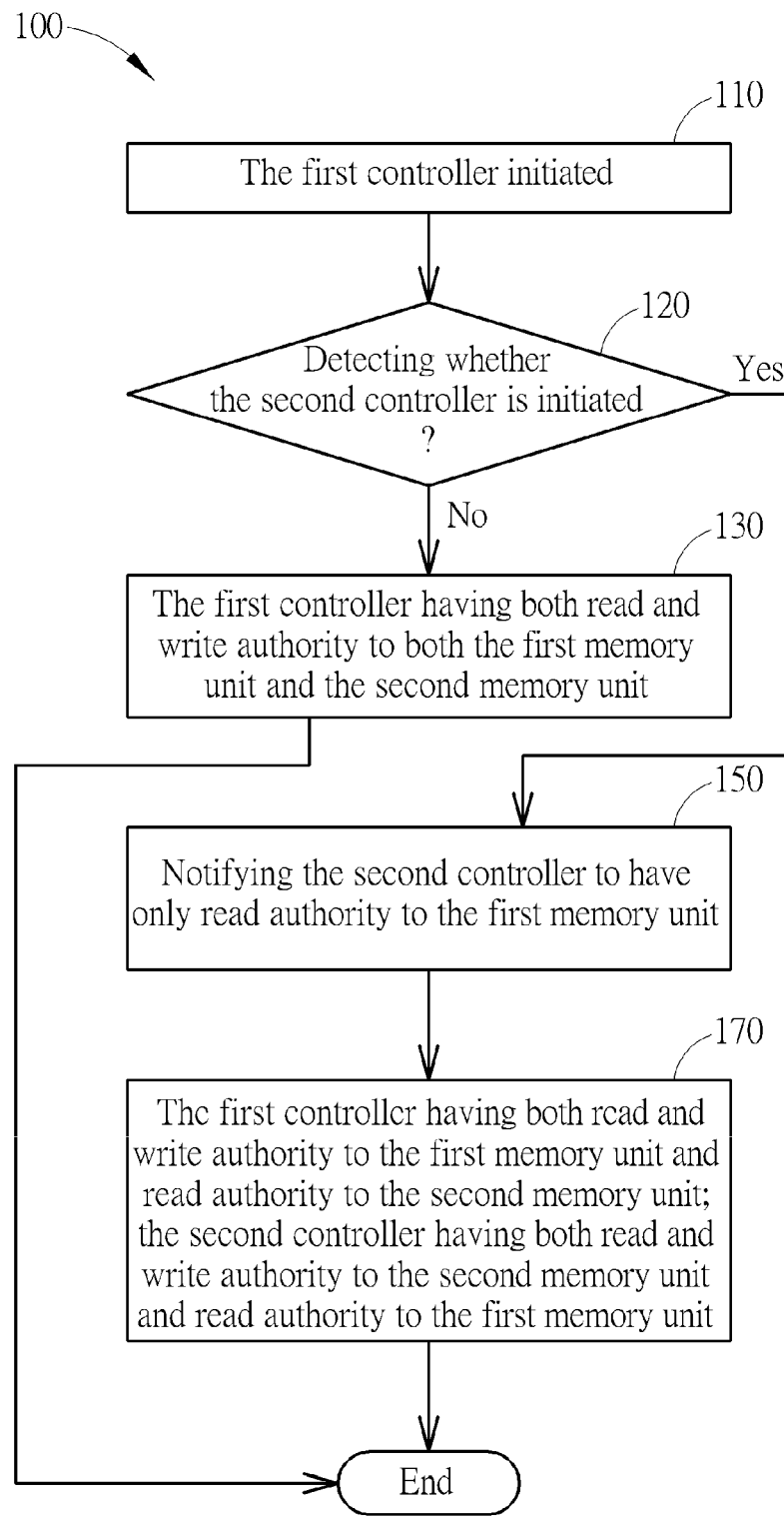
FIG. 4 is an illustration showing a flowchart of an initiating method for the first controller and the second controller.

To make the storage device 30 as described implementable, a memory accessing method for the storage device 30 is also provided in another preferred embodiment of the invention. The memory accessing method includes a number of steps as shown in FIG. 4, 5, 6A, 6B. Please refer to FIG. 4 first, which is an illustration showing a flowchart of an initiating method 100 for the first controller 31 and the second controller 32. The initiating method 100 includes the following steps:

Step 110: The first controller initiated;
Step 120: Detecting whether the second controller is initiated; if yes, go to step 150; if not, go to step 130;
Step 130: The first controller having both read and write authority to both the first memory unit and the second memory unit;
Step 150: Notifying the second controller to have only read authority to the first memory unit; and
Step 170: The first controller having both read and write authority to the first memory unit and only read authority to the second memory unit; the second controller having both read and write authority to the second memory unit and only read authority to the first memory unit.

In Step 110, the first controller 31 is initiated when the first interface 33 is connected to the first host 10 and once the first controller 31 is initiated and ready to access the first memory unit 40 and the second memory unit 50, the first controller 31 detects whether the second controller 32 is also initiated when the second interface 34 is connected to the second host 20 as described in Step 120. In the storage device 30, a communication channel can exist between the first controller 31 and the second controller 32 for the first controller 31 to detect the initiation of the second controller 32, and vice versa. If the second controller 32 has not been initiated, the storage device 30 turns to the configuration as shown in FIG. 2A and the first controller 31 has both read and write authority to both the first memory unit 40 and the second memory unit 50 as in Step 130. If the second controller 32 is detected to be initiated, the first controller 31 gives a notification to the second controller 32 and the second controller 32 configures itself to have only read authority to the first memory unit 40 as in Step 150, while the first controller 31 configures itself to have only read authority to the second memory unit 50. The second controller 32 may also actively check on the status of the first memory 40 and configures itself to have only read authority to the first memory 40 when the first memory 40 is being accessed by the first controller 32. And Step 170 shows a status of the configuration as shown in FIG. 3. Please be noted that the initiating method 100 starts with the first controller 31; however, the initiating method 100 also applies to a start with the second controller 32.

Figure 5:
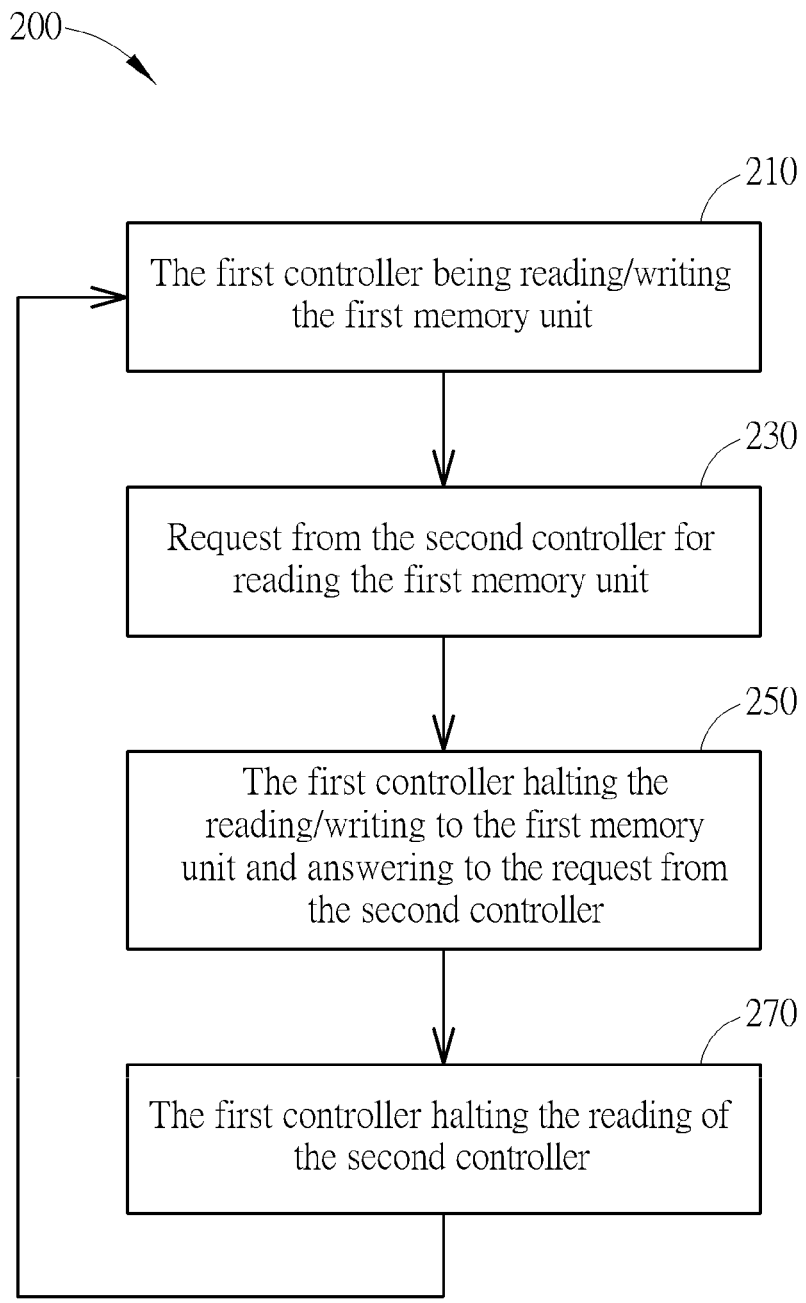
FIG. 5 is an illustration of a coordinating method in conflict accessing.

Please refer to FIG. 5 for an illustration of a coordinating method 200 in conflict accessing after Step 170 is performed. The coordinating method 200 includes the following steps:

Step 210: The first controller being reading/writing the first memory unit;
Step 230: Request from the second controller for reading the first memory unit;
Step 250: The first controller halting the reading/writing to the first memory unit and answering to the request from the second controller;
Step 270: The first controller halting the reading of the second controller.

When the first controller 31 is reading or writing the first memory unit 40 as in Step 210, an event of reading the first memory unit 40 by the second controller 32 begins with sending a request from the second controller 32 to the first controller 31 as in Step 230. Step 250 and Step 270 show that the first controller 31 answers to the request and let the second controller 32 read the first memory unit 40 once the first controller 31 halts or finishes the reading/writing to the first memory unit 40. When the second controller 32 finishes reading the first memory unit 40, the first controller 31 halts the reading process to the first memory unit 40 by the second controller 32. The first controller 31 may be notified by the second controller 32 of the finish of reading the first memory unit 40 or the first controller 31 may periodically check up on the status of the first memory unit 40 for 'knowing' that the reading from the second controller 32 is finished. It should also be noted that the coordinating method 200 may also start with the second controller 32.

Figure 6A:
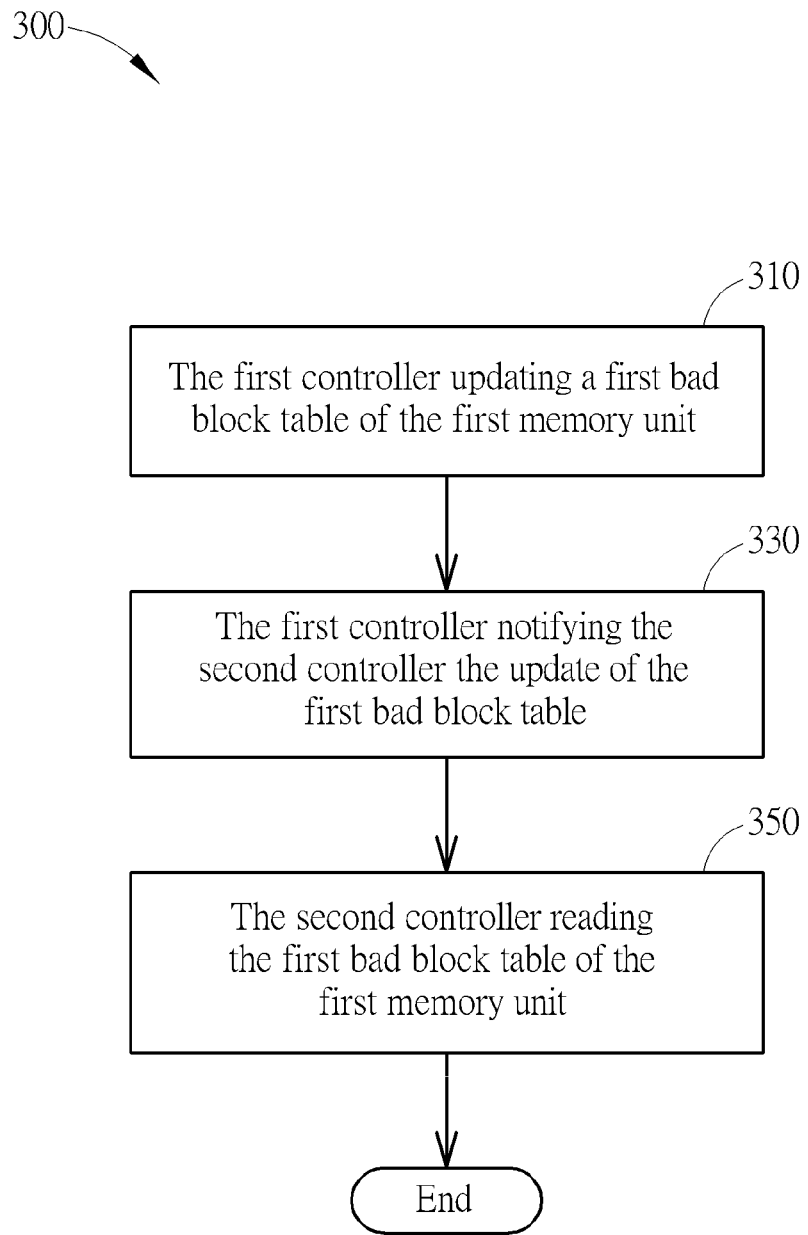
FIG. 6A is an illustration of a flowchart showing a bad block table synchronizing method initiated by a local controller.
Figure 6B:
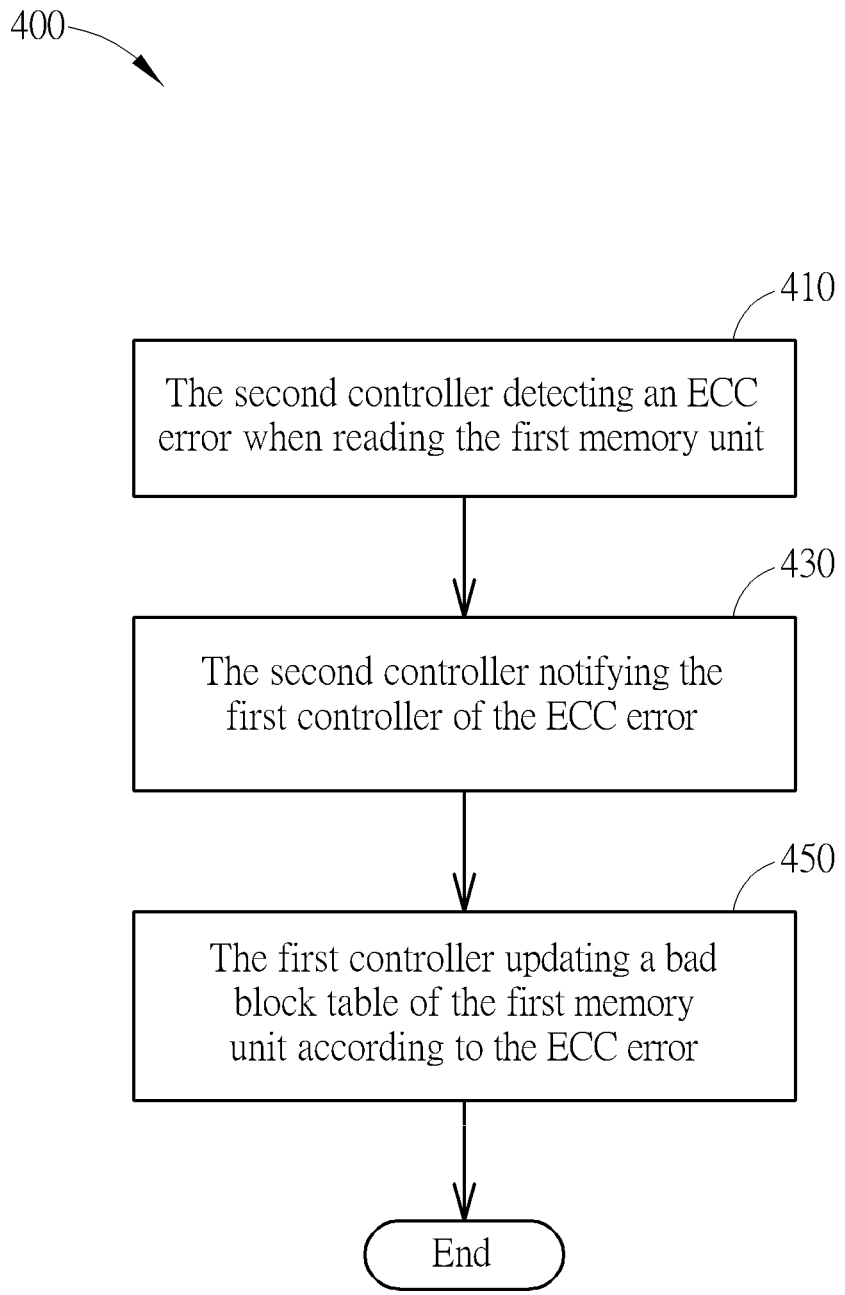
FIG. 6B is an illustration of a flowchart showing a bad block table synchronizing method initiated by a remote controller.

Please refer to FIG. 6A, 6B. FIG. 6A is an illustration of a flowchart showing a bad block table synchronizing method 300 initiated by a local controller and FIG. 6B is an illustration of a flowchart showing a bad block table synchronizing method 400 initiated by a remote controller. When the storage device 30 is configured to connect to both hosts as shown in FIG. 3, the first controller 31 still has full accessibility to the first memory unit 40 and is a local controller to the first memory unit 40, whereas the second controller 32 is a remote controller to the first memory unit 40. The same naming applies to the two controllers in a similar way regarding the second memory unit 40. In FIG. 6A, the bad block table synchronizing method 300 includes the following steps:

Step 310: The first controller updating a first bad block table of the first memory unit;

Step 330: The first controller notifying the second controller the update of the first bad block table; and Step 350: The second controller reading the first bad block table of the first memory unit.

In FIG. 6B, the bad block table synchronizing method 400 includes the following steps:

Step 410: The second controller detecting an ECC error when reading the first memory unit;

Step 430: The second controller notifying the first controller of the ECC error; and Step 450: The first controller updating a bad block table of the first memory unit according to the ECC error.

Also please be noted that the bad block table synchronizing method 300 and the bad block table synchronizing method 400 may also start with another controller and carry out the steps in a similar way.

The storage device and memory accessing method provided in the embodiments of the invention configure two separate memory units, each with dedicated I/O channel, accessible by two controllers, each corresponding to an interface connected to a host, and allows the storage device to establish at least two connections to the different hosts. As more than one connection is established between the storage device and the hosts at the same time, the first controller has both read and write accessibility to the first memory unit and the second controller has both read and write accessibility to the second memory unit, while the first controller has read-only accessibility to the second memory unit and the second controller has read-only accessibility to the second memory unit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage device adapted for being connected to and accessible by a first host and a second host, the storage device comprising:
   a first controller electrically connected to a first interface used to connect to the first host;
   a second controller electrically connected to a second interface used to connect to the second host; and
   a first memory unit and a second memory unit, both connected to and accessible by the first controller and the second controller;
   wherein when the storage device is connected to the first host and the second host at the same time, the first memory unit is readable and writable to the first controller and read-only to the second controller, and the second memory unit is readable and writable to the second controller and read-only to the first controller.

2. The storage device of claim 1, wherein when the storage device is connected to the first host and not connected to the second host, both the first memory unit and the second memory unit are readable and writable to the first controller.

3. The storage device of claim 2, wherein when the storage device is connected to the second host and not connected to the first host, both the first memory unit and the second memory unit are readable and writable to the second controller.

4. The storage device of claim 1, wherein the first interface is an universal serial bus (USB) connector.

5. The storage device of claim 1, wherein the second interface is a wireless network channel.

6. The storage device of claim 1, wherein the first memory unit and the second memory unit are non-volatile flash memory.

7. The storage device of claim 1, wherein the first memory unit comprising a first bad block table and the second memory unit comprising a second bad block table.

8. The storage device of claim 7, wherein when the storage device is connected to the first host and the second host at the same time, the first bad block table is updatable to the first controller and read-only to the second controller, and the second bad block table is updatable to the second controller and read-only to the first controller.

9. The storage device of claim 8, wherein the second controller is adapted for delivering an ECC data of the first memory unit to the first controller, and the first controller is adapted for updating the first bad block table according to the ECC data delivered by the second controller.

10. A memory accessing method for a storage device, the storage device comprising a first controller electrically connected to a first interface adapted to be connected to a first host, a second controller electrically connected to a second interface adapted to be connected to a second host, a first memory unit and a second memory unit, both connected to the first controller and the second controller, the memory accessing method comprising steps:
    detecting whether the first interface and the second interface are respectively connected to the first host and the second host; and
    configuring the first memory unit readable and writable to the first controller and read-only to the second controller when the storage device is connected to the first host and the second host at the same time.

11. The memory accessing method of claim 10, further comprising steps:
    configuring both the first memory unit and the second memory unit readable and writable to the first controller when the storage device is only connected to the first host and not connected to the second host.

12. The memory accessing method of claim 10, wherein when the storage device is connected to the first host and the second host at the same time, the memory accessing method further comprising:
    when the second controller is requesting a reading access to the first memory unit, the first controller providing for the second controller reading control to the first memory unit.

13. The memory accessing method of claim 10, further comprising steps:

the first controller updating a first bad block table of the first memory unit;

the first controller notifying the second controller an update of the first bad block table; and the second controller reading the first bad block table of the first memory unit.

14. The memory accessing method of claim 10, further comprising steps:

the second controller detecting an ECC error when reading the first memory unit;

the second controller notifying the first controller of the ECC error; and the first controller updating a bad block table of the first memory unit according to the ECC error.

15. A memory accessing method for a storage device, the storage device comprising a first controller electrically connected to a first interface, a second controller electrically connected to a second interface, a first memory unit and a second memory unit, both connected to the first controller and the second controller, the memory accessing method comprising steps:

initiating the first controller when the first interface is connected to a first host;

detecting whether the second controller is initiated;

configuring the first controller to have both read and write authority to both the first memory unit and the second memory unit when the second controller is not initiated; and configuring the first controller to have both read and write authority to the first memory unit and the second controller to have both read and write authority to the second memory unit when the second controller is initiated.

16. The memory accessing method of claim 15, further comprising:

configuring the first controller to have only read authority to the second memory unit and the second controller to have only read authority to the first memory unit when the second controller is initiated.

17. The memory accessing method of claim 15, wherein the step of detecting whether the second controller is initiated is performed by the first controller, and the second controller is initiated when the second interface is connected to a second host.

18. The memory accessing method of claim 17, wherein the step of the first controller detecting whether the second controller is initiated is performed through a communication channel existed between the first controller and the second controller.

19. The memory accessing method of claim 15, further comprising steps of:

updating a first bad block table of the first memory unit by the first controller;

notifying the second controller the update of the first bad block table; and reading the first bad block table of the first memory unit by the second controller.

20. The memory accessing method of claim 15, further comprising steps of:

detecting an ECC error by the second controller when reading the first memory unit;

notifying the first controller of the ECC error by the second controller; and updating a bad block table of the first memory unit according to the ECC error by the first controller.

* * * * *